United States Patent
Zhang

(10) Patent No.: US 9,519,834 B2
(45) Date of Patent: *Dec. 13, 2016

(54) NIGHT PARKING DETECTION

(71) Applicant: HangZhou HaiCun Information Technology Co., Ltd., HangZhou (CN)

(72) Inventor: Guobiao Zhang, Corvallis, OR (US)

(73) Assignees: HangZhou HaiCun Information Technology Co., Ltd., HangZhou, ZheJiang (CN); Guobiao Zhang, Corvallis, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 14/919,883

(22) Filed: Oct. 22, 2015

(65) Prior Publication Data
US 2016/0259984 A1 Sep. 8, 2016

Related U.S. Application Data

(63) Continuation-in-part of application No. 14/745,378, filed on Jun. 20, 2015, now abandoned, which is a continuation of application No. 14/636,335, filed on Mar. 3, 2015, now abandoned.

(51) Int. Cl.
| | |
|---|---|
| *G08G 1/14* | (2006.01) |
| *G06K 9/00* | (2006.01) |
| *H04N 5/225* | (2006.01) |
| *H04W 4/00* | (2009.01) |
| *G08B 1/00* | (2006.01) |

(52) U.S. Cl.
CPC ....... *G06K 9/00825* (2013.01); *G06K 9/00812* (2013.01); *H04N 5/2251* (2013.01); *G08B 1/00* (2013.01); *H04W 4/00* (2013.01)

(58) Field of Classification Search
CPC .................................. H40W 4/00; G08B 1/00
See application file for complete search history.

(56) References Cited

U.S. PATENT DOCUMENTS

| | | | | |
|---|---|---|---|---|
| 7,652,593 B1* | 1/2010 | Haynes | ..................... | G08G 1/14 340/932.2 |
| 8,139,115 B2 | 3/2012 | Barnes et al. | | |
| 2007/0097212 A1* | 5/2007 | Farneman | ................ | H04N 5/77 348/143 |
| 2007/0156317 A1* | 7/2007 | Breed | ..................... | B60N 2/002 701/45 |
| 2013/0113932 A1 | 5/2013 | Lipton et al. | | |
| 2013/0222157 A1* | 8/2013 | Fukushima | .......... | G08G 1/0175 340/932.2 |
| 2014/0055287 A1* | 2/2014 | Hider | ..................... | B60Q 1/484 340/932.2 |
| 2014/0074352 A1* | 3/2014 | Tate, Jr. | ............... | B62D 15/028 701/36 |
| 2014/0347196 A1* | 11/2014 | Schulz | ............. | G08G 1/096716 340/932.2 |

* cited by examiner

*Primary Examiner* — Shirley Lu

(57) ABSTRACT

The present invention discloses a night parking-monitoring device. It monitors the state change of a parking space at night by tracking at least a light of a vehicle.

13 Claims, 6 Drawing Sheets

NIGHT PARKING DETECTION

CROSS-REFERENCE TO RELATED APPLICATIONS

This application is a continuation-in-part of "Night Parking Detection", application Ser. No. 14/745,378, filed Jun. 20, 2015, which is a continuation of "Night Parking Detection", application Ser. No. 14/636,335, filed Mar. 3, 2015.

BACKGROUND

1. Technical Field of the Invention

The present invention relates to the field of electronics, and more particularly to device and method to detect parked vehicles at night.

2. Prior Arts

Locating a vacant parking space causes much frustration to motorists. It increases fuel consumption and has a negative impact to the environment. To conserve energy resources and enhance the quality of the environment, it is highly desired to develop a parking-monitoring system, which can transmit substantially real-time parking states (i.e. occupied or vacant) to motorists. Based on the parking states, a motorist can be guided towards a vacant parking space at destination.

Parking enforcement is an important aspect of city management. The current parking-enforcement system is patrol-based, i.e. parking enforcement officers patrol the streets and/or parking lots to enforce the parking regulations. This operation requires significant amount of man power and also consumes a lot of fuel. It is highly desired to take advantage of the above-mentioned parking-monitoring system and automatically measure the parking time for each monitored parking space.

Both parking monitoring and enforcement are based on parked vehicle detection. To detect a parked vehicle, prior arts use a camera to capture the image of a parking area, from which to extract the parking state. Relying on the natural lighting to capture images, prior arts only work during the day. At night, the camera cannot capture the image of the parking area under low ambient lighting. As a result, the parking state cannot be extracted.

U.S. Pat. No. 7,652,593 B1 issued to Haynes et al. on Jan. 26, 2010 discloses a parking management system. It comprises a plurality of video input devices 1420 and parking lot lights 1225. The parking lot lights 1225 can be used to illuminate the parking lot at night. However, to monitor a large number of street parking spaces, a large number of street lights need to be installed, which would be expensive. Haynes also discloses various types of vehicle indicators (e.g. position indicator, engine indicator and direction indicator), whose outputs may be used to extract the parking state. However, most existing vehicles are not equipped with these indicators. Installing them on each vehicle is impractical.

OBJECTS AND ADVANTAGES

It is a principle object of the present invention to conserve energy resources and enhance the quality of the environment.

It is a further object of the present invention to detect parked vehicles under low ambient lighting at night while incurring minimum change to the infrastructure.

It is a further object of the present invention to provide night parking detection without installing a large number of streetlights.

It is a further object of the present invention to provide night parking detection without installing new equipment on each vehicle.

In accordance with these and other objects of the present invention, the present invention discloses device and method to detect parked vehicles at night.

SUMMARY OF THE INVENTION

The present invention discloses a parking-monitoring device which monitors at least a parking area at night. It comprises a camera and a processor. The camera captures a sequence of images of at least a light (e.g. a headlight, a taillight) of a vehicle. Due to the low ambient lighting, the camera cannot acquire the details of the parking space. In other words, the images would be fuzzy. The processor determines the parking state of the parking space from the track of the light obtained from the sequence of images, without using the output of any vehicle indicator. If the total displacement of the vehicle light is larger than a pre-determined value, or the displacement of the vehicle night has a directional change, the parking state is considered changed.

The above method (i.e. the night-parking detection using vehicle lights) uses only the images captured by the camera. It does not require installing a large number of street lights or equipping each vehicle with vehicle indicators. Furthermore, this method can be combined with the night-parking detection using the passing-by vehicle lights (referring to U.S. patent application "Night Detection of Parked Vehicles", Ser. No. 14/636,323, filed on Mar. 3, 2015). The first method determines the parking state change, while the second method directly determines the parking state. These two methods complement each other. Combining them can improve the robustness of the detected parking state.

Figure 1A:
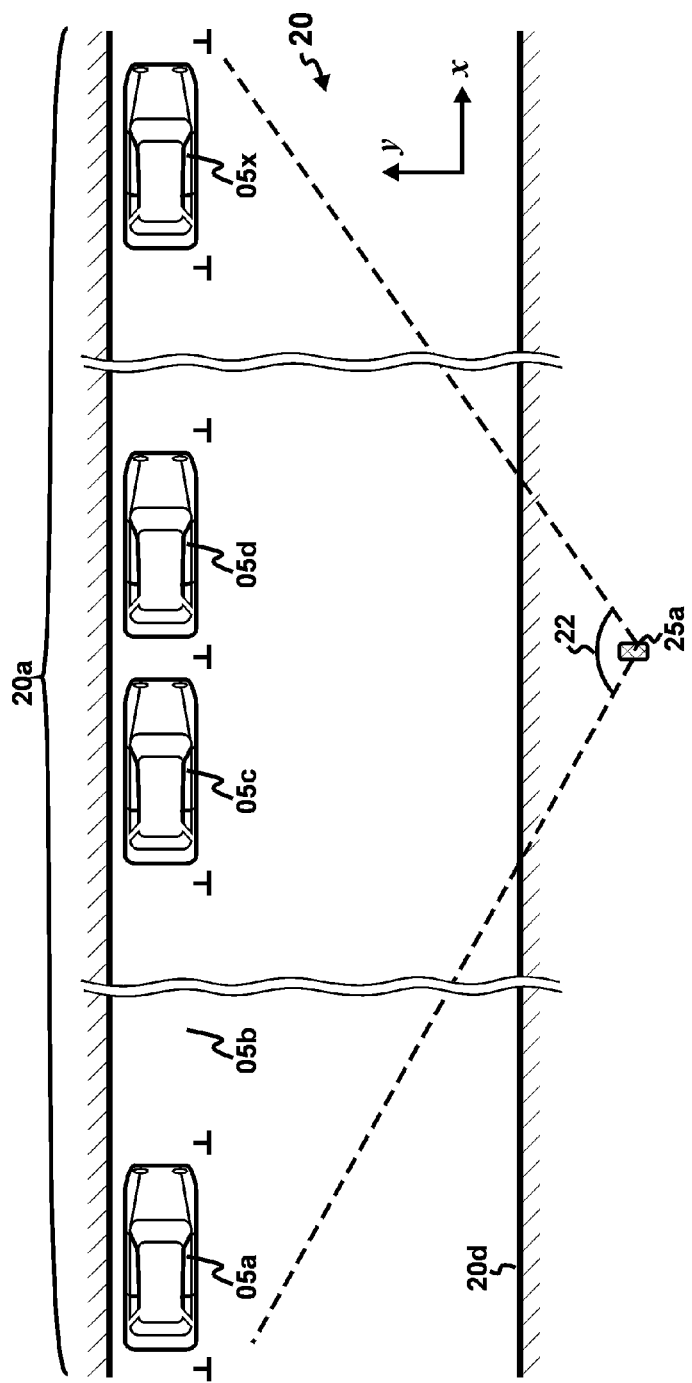
FIGS. 1A-1B illustrate the placement of a preferred parking-monitoring device.

It should be noted that all the drawings are schematic and not drawn to scale. Relative dimensions and proportions of parts of the device structures in the figures have been shown exaggerated or reduced in size for the sake of clarity and convenience in the drawings. The same reference symbols are generally used to refer to corresponding or similar features in the different embodiments.

DETAILED DESCRIPTION OF THE PREFERRED EMBODIMENTS

Those of ordinary skills in the art will realize that the following description of the present invention is illustrative only and is not intended to be in any way limiting. Other embodiments of the invention will readily suggest themselves to such skilled persons from an examination of the within disclosure.

Figure 1B:
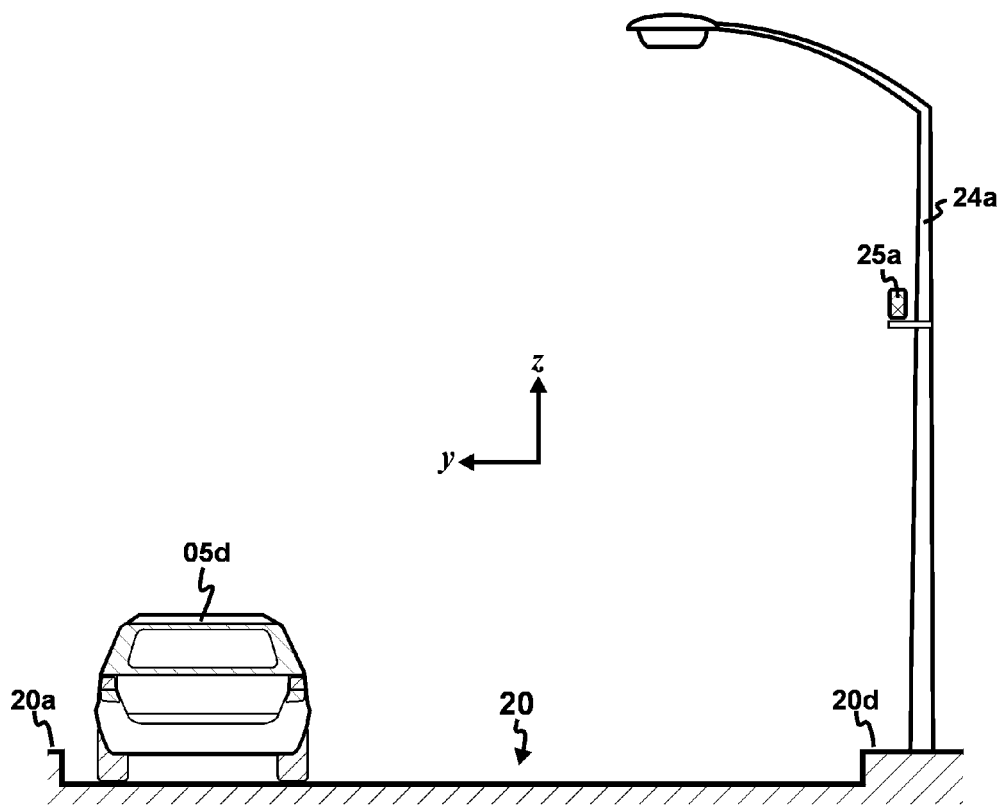

FIGS. 1A-1B illustrate the placement of a preferred parking-monitoring device 25a. FIG. 1A is the top view of a curb 20a along a street 20. There are a plurality of parking spaces 05a, 05b . . . 05x along the curb 20a. The parking-monitoring device 25a is placed on the opposite curb 20d of the street 20 in such a way that the viewing angle 22 of the device 25a covers as many parking spaces as possible. FIG. 1B is a cross-sectional view of the street 20. The parking-monitoring device 25a is mounted on a fixed structure 24a such as an utility pole or a street-lamp post. The fixed structure 24a can provide power to the device 25a. The device 25a is typically mounted at a position higher than the top of the vehicles parked in the street 20. This arrangement makes it easier for the image-recognition app to differentiate between an occupied parking space and a vacant parking space.

Figure 2:
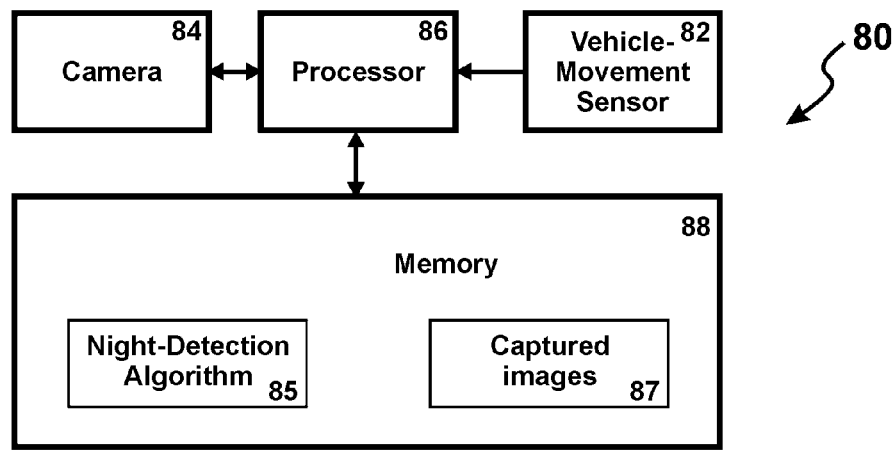
FIG. 2 is a block diagram of a preferred night parking-monitoring device.
Figure 3:
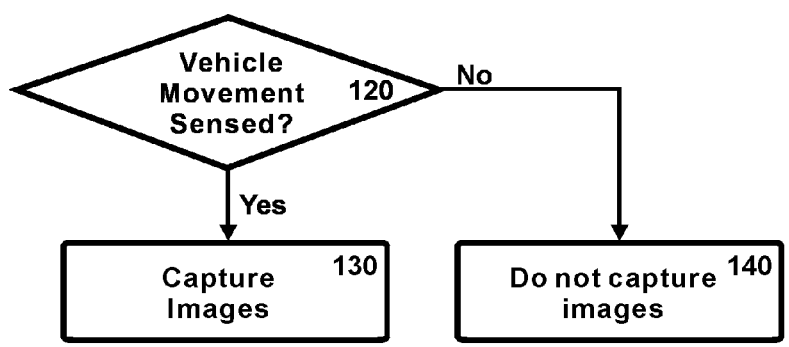
FIG. 3 is a flow chart showing the switch between active and idle states for the camera.

Referring now to FIGS. 2 and 3, a block diagram of a preferred night parking-monitoring device 80 and its switch from active to idle states are shown. It comprises a vehicle-movement sensor 82, a camera 84, a processor 86 and a memory 88. The camera 84, when active, captures a sequence of images of the parking spaces. The memory 88 stores a night-detection algorithm 85 and the sequence of images 87 captured by the camera 84, while the processor 86 processes these images 87. The vehicle-movement sensor 82 comprises an audio sensor, an optical sensor, or an electromagnetic (EM) sensor. The audio sensor listens to the ambient sound change caused by a nearby moving vehicle; the optical sensor monitors the ambient light change caused by a nearby moving vehicle; the electromagnetic sensor detects the changes in electromagnetic wave caused by a nearby moving vehicle. When the vehicle-movement sensor 82 detects at least a nearby moving vehicle (step 110), the parking-monitoring device 80 is placed in an active state and its camera 84 starts to capture a sequence of images (step 120); otherwise, it will be placed in an idle state and does not capture any images (step 130).

Figure 4:
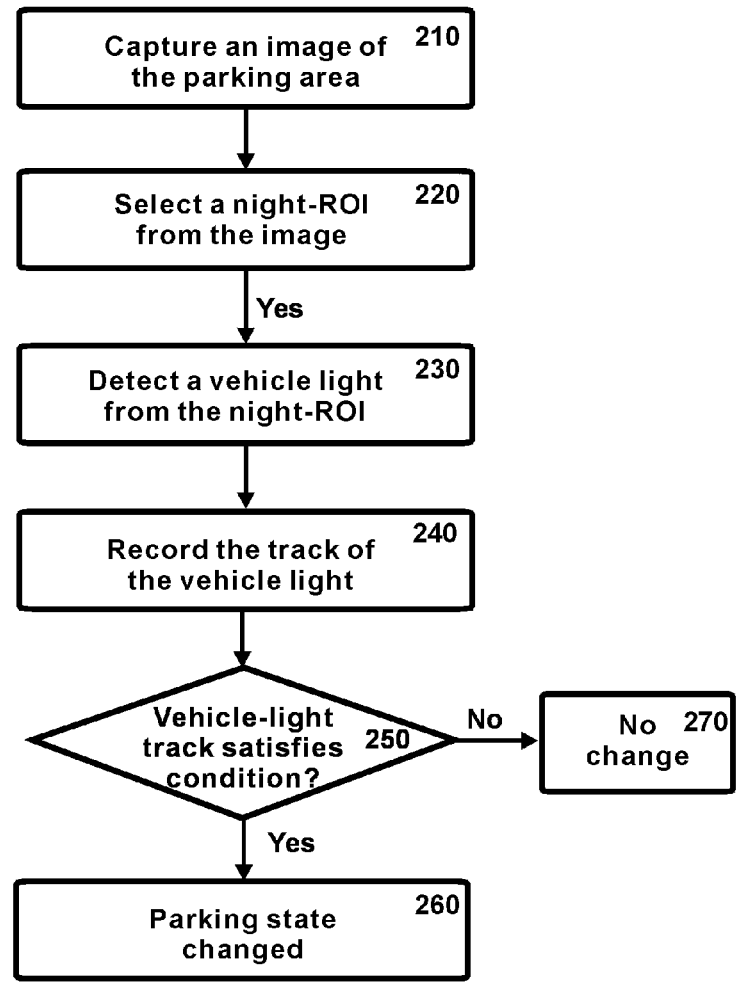
FIG. 4 is a flow chart showing a preferred night-parking detection method using the parked vehicle lights.

Referring now to FIG. 4, a preferred night-parking detection method using the parked vehicle lights is shown. The camera 84 captures a sequence of images of the parking area (step 210). Due to the low ambient lighting, the camera cannot acquire the details of the parking space. In other words, the images would be fuzzy. The processor 86 selects a night-ROI for each monitored parking space (step 220). As will be shown in FIGS. 5 and 6A, the night-ROI is different from the day-ROI. Once a vehicle light is detected in the night-ROI (step 230), its track will be recorded and analyzed from the sequence of captured images (step 240). If this track satisfies certain conditions (step 250, referring to FIGS. 7A-7B), the parking state is considered changed (step 260). Otherwise, there is no change (step 270). To better track the vehicle light, the rate the camera 84 captures images at night is preferably faster than that during the day.

Figure 5:
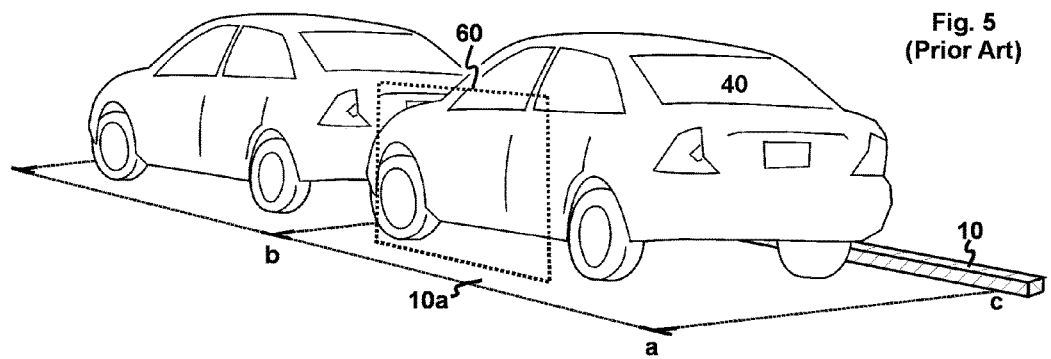
FIG. 5 illustrates a day-ROI for a parked vehicle (prior art)

FIG. 5 illustrates a day-ROI 60 for a parked vehicle 40. The vehicle is parked along the curb 10 within the parking space 10a. One boundary of the parking space 10a is line "ab". The day-ROI 60 covers the body of the parked vehicle. By extracting the bottom edge of the vehicle body and/or the bottom edge of the driver's side window within the day-ROI 60, a vehicle is detected in the parking space 10a.

Figure 6A:
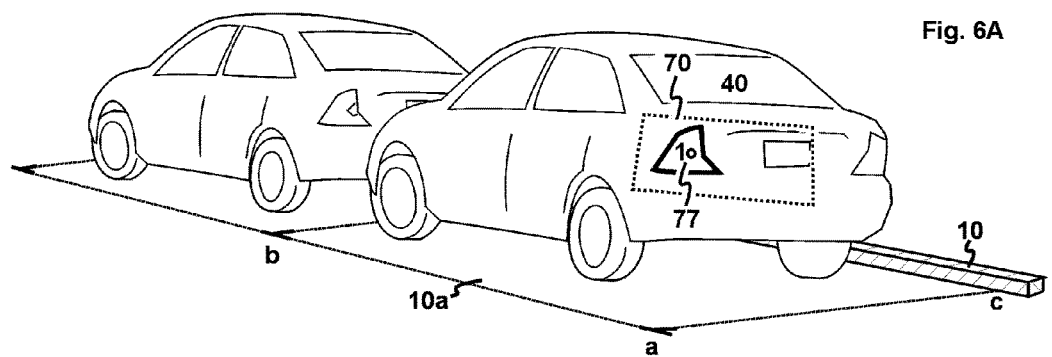
FIG. 6A illustrates a preferred night-ROI for a parked vehicle.

FIG. 6A illustrates a preferred night-ROI 70 for the parked vehicle 40 at time t1. The night-ROI 70 is different from the day-ROI 60. In this preferred embodiment, the night-ROI 70 covers the taillight(s) 77 of the parked vehicle 40. Apparently, the night-ROI 70 may also cover the headlight(s) of the parked vehicle 40. At night, the only vehicle feature that can be captured by the camera 84 is the taillight(s) 77 (or headlights). The brightest spot in the image of the taillight 77 (referred to as the taillight core) is marked by a point 1 in FIG. 6A and will be used to denote the location of the taillight 77.

Figure 6B:
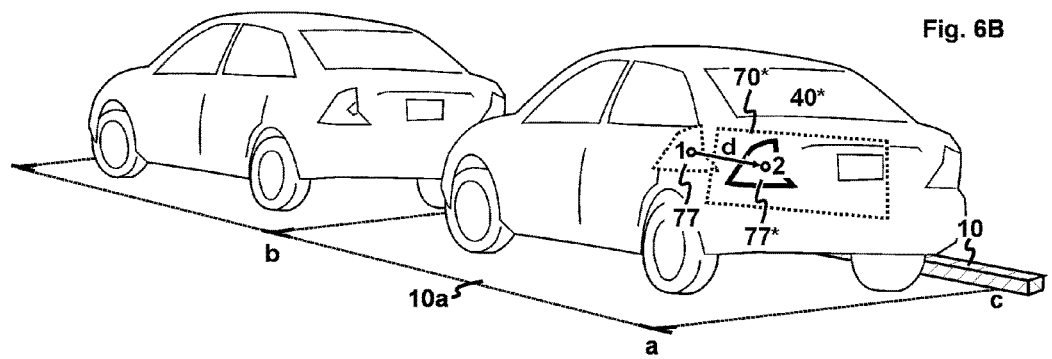
FIG. 6B illustrates a preferred night-ROI of a displaced vehicle.

FIG. 6B illustrates a preferred night-ROI 70* of a displaced vehicle 40* at time t2. The image of FIG. 6B is captured immediately after that of FIG. 6A. Once the driver moves the vehicle 40 by a distance d (in this case, to back the vehicle 40 out of the parking space 10a), the core of the taillight 77* moves from point 1 to point 2. In this preferred embodiment, the night-ROI 70* is a moving ROI. It moves with the vehicle 40* and has the same relative placement with the taillight 77*. To be more specific, at time t1, the taillight 77 is detected in the night-ROI 70; at time t2, the taillight 77* is first detected in the night-ROI 70; then by detecting the displacement d of the taillight 77*, the night-ROI 70* is displaced by the same value. The moving night-ROI can facilitate detection of a moving taillight 77.

Figure 7A:
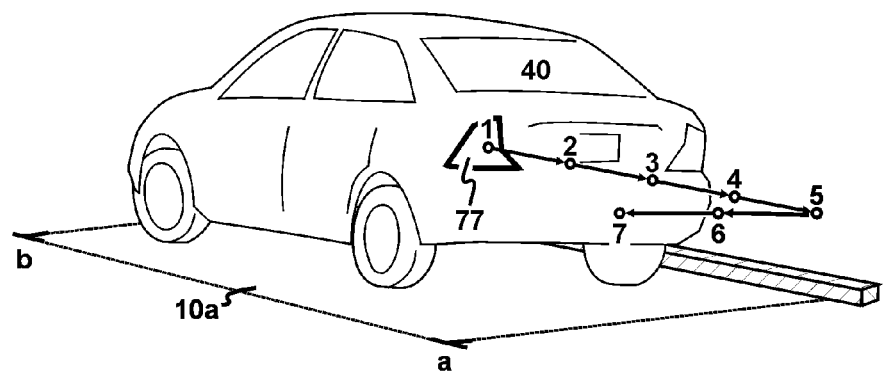
FIGS. 7A-7B illustrate two preferred vehicle-light tracks that are qualified for parking state changes.
Figure 7B:
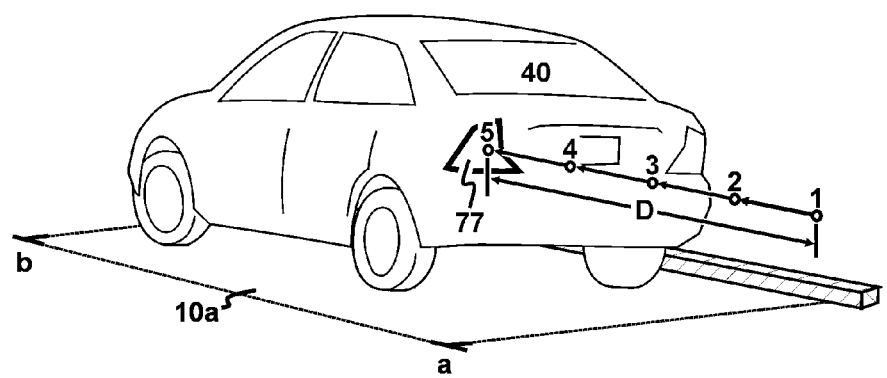

FIGS. 7A-7B illustrate two preferred vehicle-light tracks that are qualified for parking state changes. In FIG. 7A, the cores of the taillight 77 in seven successive images move from point 1 to point 7. The displacements from point 1 to point 5 and from point 5 to point 7 are straight lines; at point 5, the displacement changes direction. This track is characteristic of a vehicle's leaving a parking space. By changing the displacement direction of the vehicle light 77, the parking space is considered vacated. In FIG. 7B, the cores of the taillight 77 in five successive images move from point 1 to point 5. This track is characteristic of a vehicle's entering a parking space. Once the total displacement D of the vehicle light 77 is above a threshold, the parking space is considered occupied.

While illustrative embodiments have been shown and described, it would be apparent to those skilled in the art that may more modifications than that have been mentioned above are possible without departing from the inventive concepts set forth therein. The invention, therefore, is not to be limited except in the spirit of the appended claims.

What is claimed is:

1. A parking-monitoring device for monitoring at least a parking space under a low ambient lighting, comprising:
   a camera located on a fixed structure, wherein said camera captures a sequence of images of at least a light of a vehicle, but cannot acquire the details of said parking space under said low ambient lighting;
   a processor coupled to said camera, wherein said processor determines the change of the parking state of said parking space only from a track of said light obtained from said sequence of images, without using the output of any vehicle indicator.

2. The device according to claim 1, wherein said light is a headlight of said vehicle.

3. The device according to claim 1, wherein said light is a taillight of said vehicle.

4. The device according to claim 1, wherein said camera captures images at a faster rate at night than during the day.

5. The device according to claim 1, wherein said parking state is changed when the direction of said track changes.

6. The device according to claim 1, wherein said parking state is changed when the displacement of said track exceeds a pre-determined value.

7. The device according to claim 1, further comprising a vehicle-movement sensor.

8. The device according to claim 7, wherein said camera captures said sequence of images when said vehicle-movement sensor detects a nearby moving vehicle.

9. The device according to claim 7, wherein said camera does not capture any images when said vehicle-movement sensor does not detect a nearby moving vehicle.

10. The device according to claim 7, wherein said vehicle-movement sensor comprises an audio sensor.

11. The device according to claim 7, wherein said vehicle-movement sensor comprises an optical sensor.

12. The device according to claim 7, wherein said vehicle-movement sensor comprises an electromagnetic sensor.

13. The device according to claim 1, further comprising a passing-by vehicle detector, wherein the state of the said parking spaces is determined from at least an image of said parking space illuminated by at least a light beam output from a passing-by vehicle.

* * * * *